United States Patent [19]

Wesby

[11] Patent Number: 5,051,741
[45] Date of Patent: Sep. 24, 1991

[54] LOCATING SYSTEM

[76] Inventor: Philip B. Wesby, Kolk 14 2611 KD, Delft, Netherlands

[21] Appl. No.: 501,091

[22] Filed: Mar. 28, 1990

[51] Int. Cl.$^5$ ............................................. H04B 7/00
[52] U.S. Cl. .............................. 340/825.49; 340/529; 340/572; 342/44; 342/51
[58] Field of Search ...................... 342/42, 44, 51, 52, 342/453, 457; 340/825.08, 825.54, 825.49, 572, 573, 539; 455/7, 11, 31, 32, 33

[56] References Cited

U.S. PATENT DOCUMENTS 4,818,998  4/1989  Apsell et al. ........................ 342/51
4,864,313  9/1989  Konneker ............................ 342/457

Primary Examiner—Donald J. Yusko
Assistant Examiner—Dervis Magistre
Attorney, Agent, or Firm—Robert M. Asher

[57] ABSTRACT

A locating system and method in which a network of communication stations are spread over a surveillance area. Each moveable element is provided with a transponder having an associated identification code. A paging signal sent out over the surveillance area is picked up by the transponders and the one with the identification code provided in the page responds. The response is made at a frequency different from the page. The response is picked up by the nearest communication stations. A master station communicates with the communication stations at a frequency different from that used by the paging signal or the transponder. The master station which interrogates all the communication stations locates the paged transponder to within a sector bordered by the communication stations that received the response from the transponder. The communication stations can be subdivided into three or more interspersed arrays.

41 Claims, 6 Drawing Sheets

LOCATING SYSTEM

FIELD OF THE INVENTION

This invention relates to systems for the remote monitoring and determination of the location of moveable objects. In particular, the invention is directed to the remote monitoring and determination of the location of persons within a specified area, such as a theme park, shopping mall, airport or other recreational area, for the determination of the location of specified stock within a warehouse, and for the determination of the location of personnel and vehicles in an industrial complex, although it is not limited thereto.

BACKGROUND OF THE INVENTION

The stress and anxiety caused to parents when they lose their children in very crowded places is well known. No electronic system is commonly in place for parents to establish the whereabouts of their children at recreational areas such as theme parks or in shopping malls. Similarly, for teachers in charge of a group of students, the problem of maintaining the group intact within a crowded environment can be very difficult. In other instances, friends may wish to part for a specified time and meet up at a certain location within a recreational area. Similar problems exist at skiing resorts. In warehouse complexes, problems exist with stock flow analysis; it is difficult to maintain accurate real-time statistics for stock present and to provide an efficient least-time routing for the retrieval of requested items from various locations within a warehouse complex. In other industrial complexes such as chemical refineries, timber yards, etc., time is often lost determining the location of personnel and vehicles, and at airports, the ability to locate and identify objects and persons remotely would greatly improve security and safety. Present systems do not provide the comprehensive facilities which would enable these problems to be solved.

DESCRIPTION OF THE PRIOR ART

A system for the remote identification of livestock is disclosed in U.S. Pat. No. 4,075,632 to Baldwin et al. The Baldwin patent teaches an electronic identification system comprising an implantable transponder which receives an unmodulated radio frequency signal from a transmitter/receiver. The transponder amplitude modulates the signal with predetermined uniquely coded information and reflects or retransmits it to the transmitter/receiver. Decoding of the reflected signal allows the transponder to be identified. The system of U.S. Pat. No. 4,075,632 is an identification system rather than a location system.

A further system for the remote identification of livestock is disclosed in European Patent Application No. 0 056 726, filed by the Australian Meat and Live-Stock Corporation. Although this system has the advantage of being able to determine the identification of specified animals using coded transponders, interrogation of the transponders is performed using a single mobile interrogation unit. As a locator, this system can point the mobile unit in the direction of a specified animal, if it is within range.

In U.K. Patent Application No. 2,193,359, an area communications system is disclosed which is able to provide positional information about moveable elements. This system works by continuous position monitoring. Interrogator units, positioned at an access point to one or more zones within the operational area, communicate with a central unit and provide continuous position monitoring of the zonal positions of the moveable elements. Postional information concerning any particular moveable element is obtained via the interrogator units, and thus the system has limitations. The range of an interrogator unit is limited so that it is only able to interrogate and update the positional status of a moveable element actually passing into its associated zone. Continuous position monitoring entails continuously updating the positional status of any particular element and thus would be unsuitable for several thousand moveable elements, considering the processing capability which would be required. Further, this system does not lend itself to applications where there are no physical boundaries to define the zones.

SUMMARY OF THE INVENTION

The present invention is directed to a system for locating the position of moveable elements in a wide area. Each moveable element is provided with a transponder. Each transponder is associated with a unique identification code. The system pages the entire area with one of the identification codes in order to locate a moveable element. A network of communication stations is spaced throughout the surveillance area. The communication stations can receive response signals that are sent from within the surveillance area by a transponder. A master station communicates with each of the communication stations to locate a moveable element from learning which communication stations received a response signal.

Preferably, in accordance with the present invention, at least three radio frequencies are used. A first frequency is used to send out the paging signal with the identification code over the entire surveillance area. A transponder converts the first radio frequency signal into a response signal carried by a second frequency. A third frequency is used by the master station in communicating with each of the communication stations The master station continuously and cyclically interrogates each of the communication stations. The communication station only communicates with the master in response to an interrogation. Thus, in accordance with the present invention a single user radio bus is in effect.

The network of communication stations can be set up in the form of three interspersed sub arrays. In most cases, a response signal from a transponder will be picked up by only one communication station in each of the sub arrays. The location of the transponder can be more quickly determined by the master station as it usually only needs to locate one communication station from each sub array. The location of the transponder is identified as being within the sector defined by the three communication stations that received the response signal from the transponder.

The present invention advantageously relieves the anxiety of parents and children who have become separated in a large park in which the invention has been implemented. By using separate frequencies, the present invention advantageously permits paging and requesting a new page to occur at the same time. The present invention speeds up processing by using sub arrays of communication stations in the network.

Other objects and advantages of the invention will become apparent from the following detailed description of the invention and considered in conjunction with the accompanying drawings.

DETAILED DESCRIPTION OF THE PREFERRED EMBODIMENTS

Figure 1:
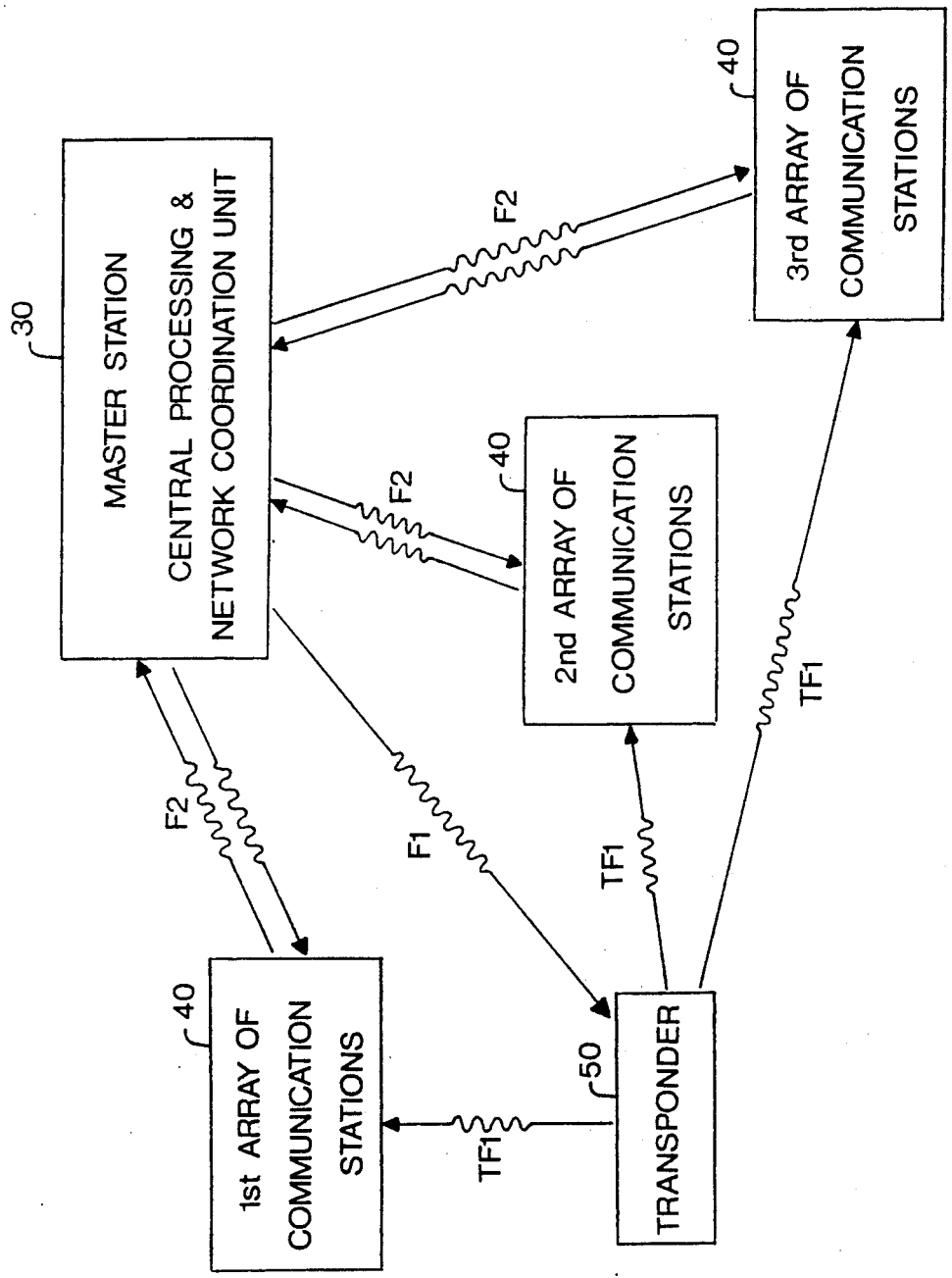
FIG. 1 is a block diagram of the locating system of the present invention.

Referring now to the drawings, FIG. 1 illustrates the relationships between the various components of the locating system of the present invention. A master station 30 controls the operation of the system. A network of communication stations is spread over the entire area in which the present invention is implemented. For example, in a theme park the communication stations would be spread out all over the park so that a moveable element anywhere in the park could be located. The communication stations may be subdivided into separate arrays 40. The arrays are interspersed such that in a given location, the three nearest communication stations would be one from each of the different arrays. Preferably, these three communication stations are equally spaced from one another.

In order to locate a moveable element within the surveillance area of the system, each element is provided with a transponder 50. Each transponder is responsive to an associated identification code. Each transponder has a different code associated therewith. Thus, the page containing a specified identification code may be sent throughout the area and picked up by the transponder associated with that identification code.

When a page is requested, according to the presently preferred embodiment, the master station 30 primes the network of communication stations 40 as it cycles through communication with each communication station or in a single burst transmission to the whole network. A communication station is primed by providing it with the unique code of the transponder to be paged. After the communication stations have been primed, a page is sent out at a first frequency F1 from the master station. The page signal is strong enough to be received by transponders anywhere within the entire surveillance area.

A transponder 50 recognizing its identification code in a page, transforms the frequency of the signal into a responding frequency TF1 to produce a response signal at the TF1 frequency. The response signal comprises the paged, unique identification code, broadcast at the TF1 frequency. The communication stations are tuned to receive signals broadcast at this frequency. The transponder's response signal is very weak compared to the page signal. Thus, only the communication stations nearest the responding transponder 50 receive the response signal. As is presently preferred, a communication station compares any received transponder identification codes on TF1 with the code it received when it was primed by the master station. In this way, the communication station itself can determine whether it has indeed identified the sought transponder. The sensitivity of the various communication stations is maintained at a level such that preferably only the three closest communication stations indicate that they have received the response signal.

The communication stations are cyclically interrogated by the master station 30 at a third frequency F2 different from frequencies F1 and TF1. In this way, the master station learns if a page is being requested at one of the communication stations or if any of the stations has received a response signal from a transponder 50. By identifying the communication stations that have received a response signal from a paged transponder, the master station 30 can identify the location of that transponder to within a sector defined by the receiving communication stations.

When the communication stations are divided into three sub arrays, preferably only one communication station from each sub array will indicate that a response signal has been received. By treating the network of communication stations as three interspersed arrays, since the master expects only one communication station in each array to indicate a positive identification of the response signal, as soon as one positive identification has been made, the master station can direct its interrogation to communication stations of the other arrays. To even further speed the processing, the master station first interrogates the other arrays in the vicinity of the communication station that first indicated a positive identification. In accordance with an alternative embodiment, the communication between the master station and the communication stations can take place at three different frequencies, one for each different array. This would speed processing by permitting simultaneous parallel interrogations of each array.

Figure 2:
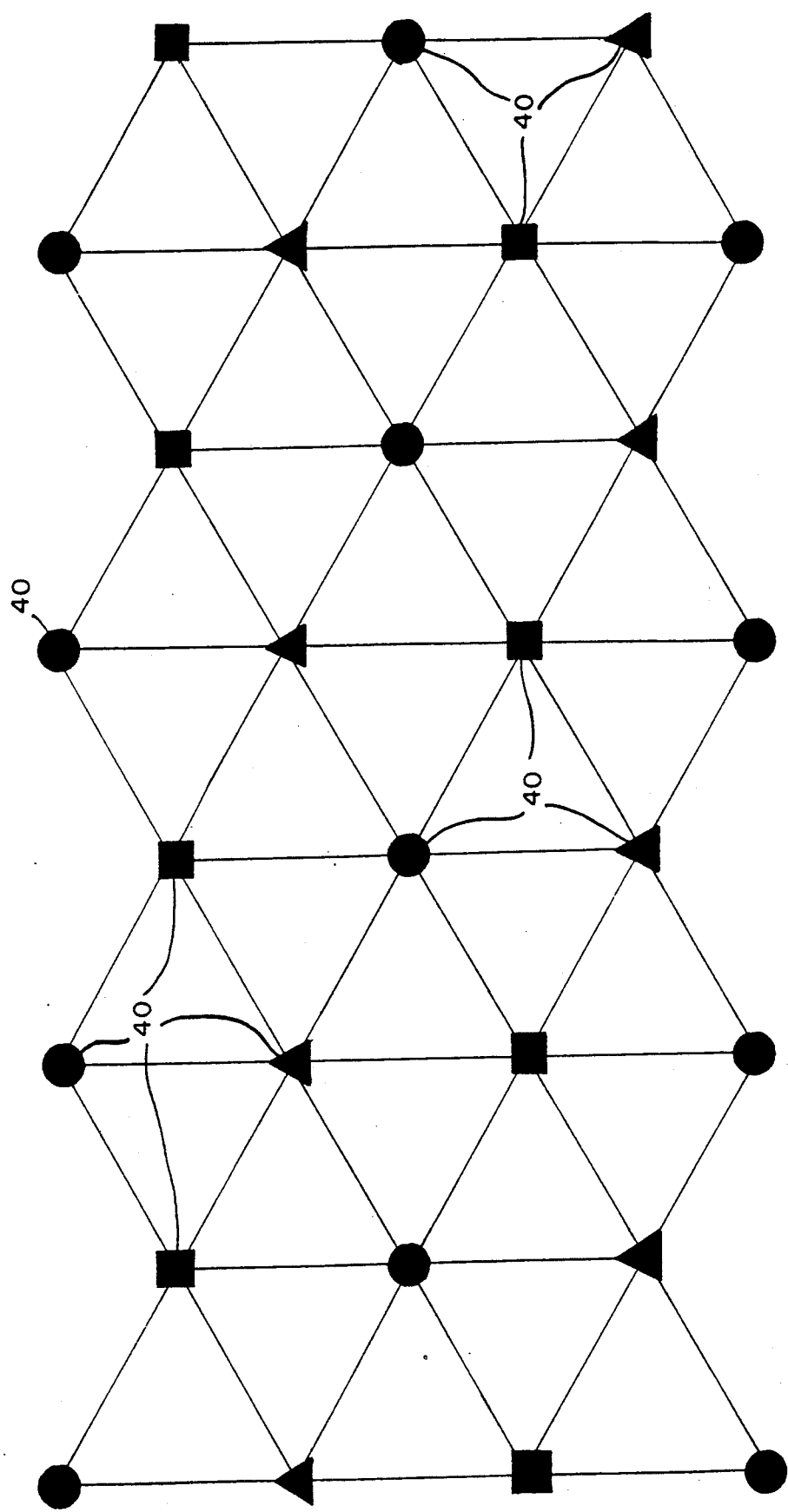
FIG. 2 is a schematic diagram of part of the surveillance area showing the relationship of the three arrays of communication stations.
Figure 4:
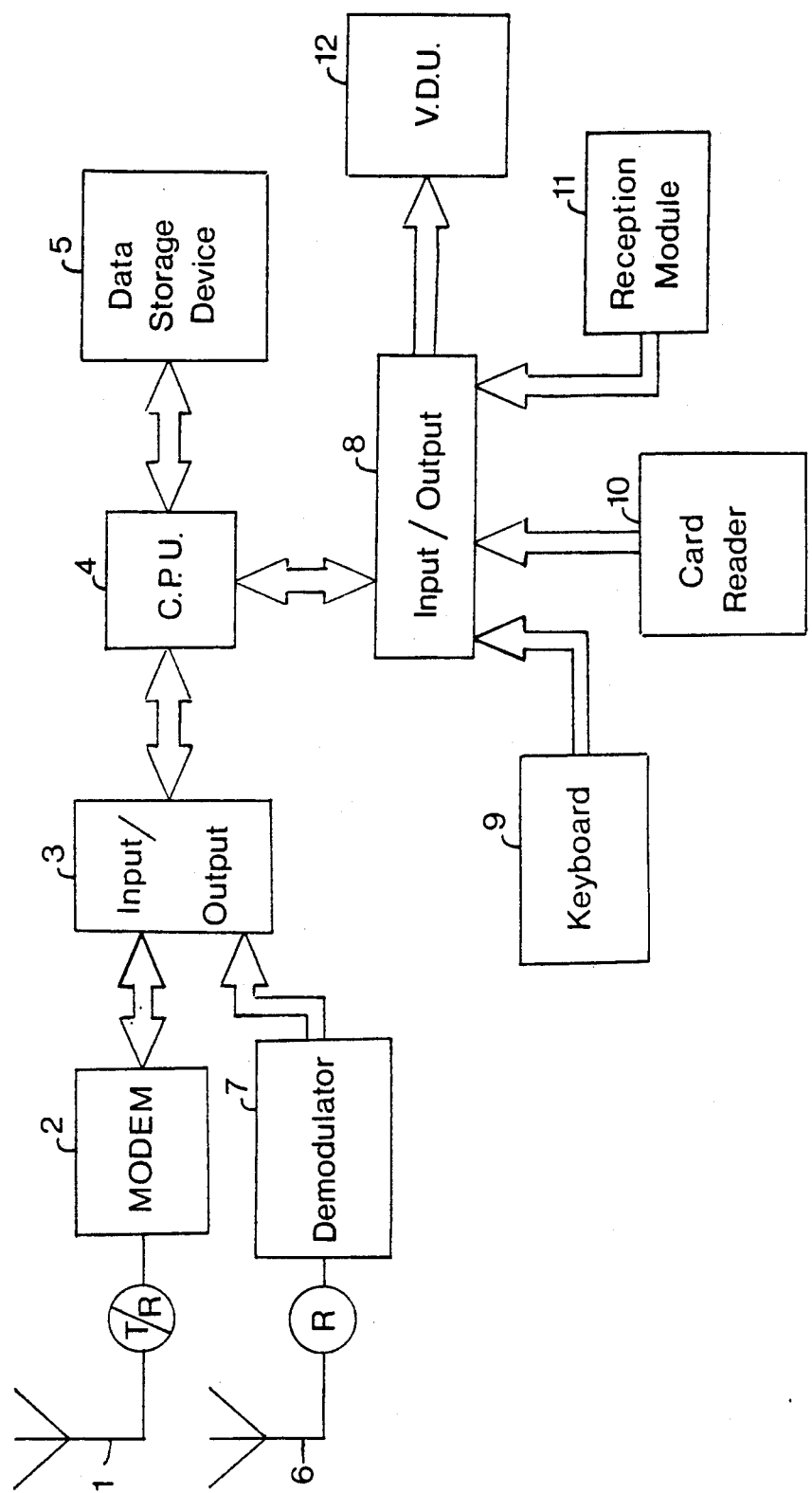
FIG. 4 is a block diagram of a communication station of the present invention.

FIG. 2 shows the geometrical relationship between the arrays of communication stations. The triangle, square and circle each are representative of a different array of communication stations. Thus, the figure demonstrates three arrays of communication stations. The communication stations in each of the arrays all include the same essential elements. Communication stations are discussed in greater detail below with reference to FIG. 4. The communication stations divide an area into a plurality of triangular sectors. Each sector in FIG. 2 is an equilateral triangle. Each sector is bordered by a communication station from each of the three different arrays.

Figure 3B:
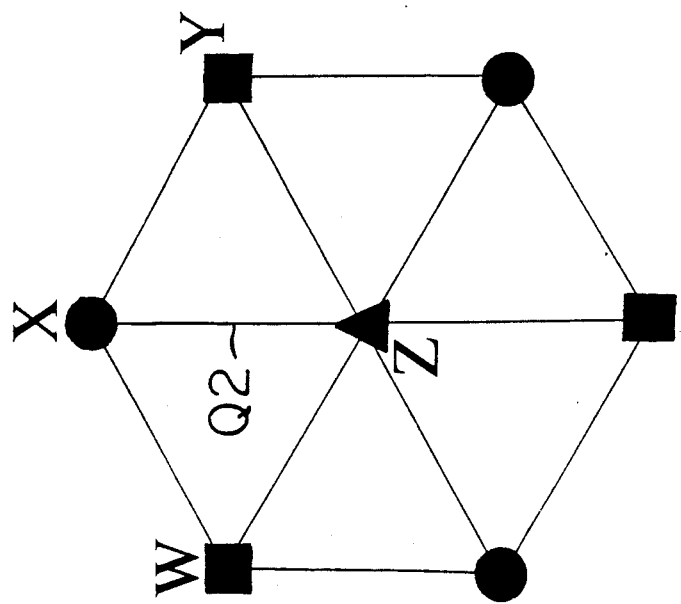
FIG. 3A and FIG. 3B are schematic diagrams which demonstrate the locating ability of the present system.
Figure 3A:
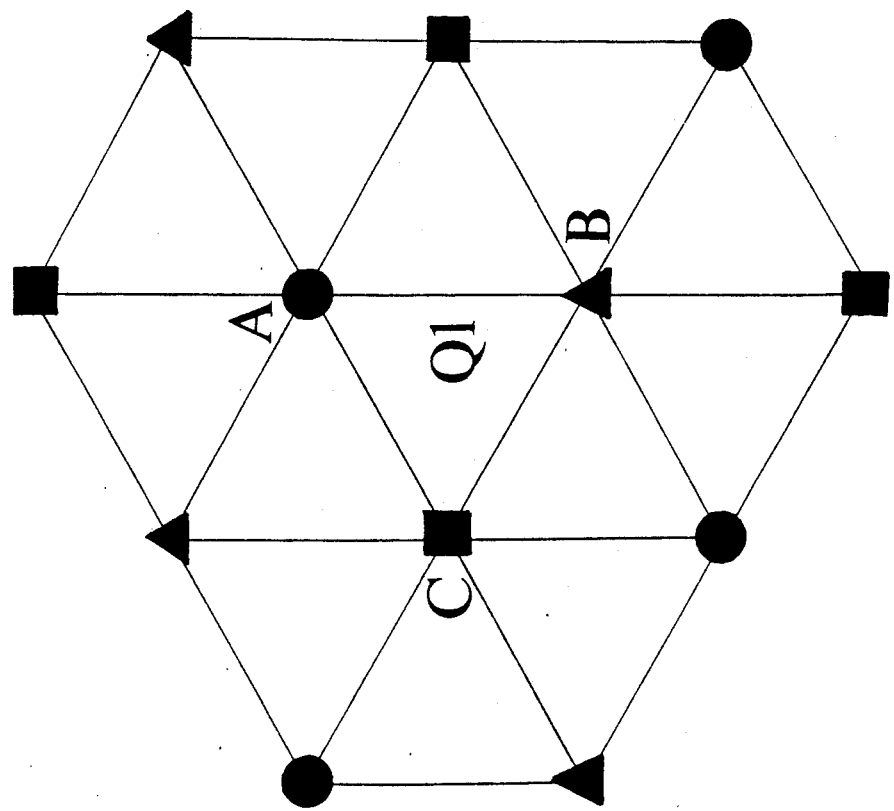

Most often, when a transponder is paged by the master station, it will emit a response signal that is received by three communication stations bordering the sector in which the transponder is located. As shown in FIG. 3A, a transponder Q1 would be detected responding at the communication stations A, B and C. When these three communication stations indicate to the master station that a response signal has been detected from the paged transponder, the master station will be able to indicate the location of the transponder to within a sector. That sector is identified to the user who requested the page. It is possible at times for a transponder to be located directly in between two sectors such that four communication stations indicate receipt of the response signal as shown in FIG. 3B. In such a situation the master station would identify the location of the transponder as the two sectors outlined by the rhombus WXYZ. If two receiving communication stations, such as W and Y, are from the same array, the master station could indicate that the transponder is probably located in the area surrounding the line intersecting the rhombus from station X to station Z.

The network of communication stations may be varied as to distances such that in more densely populated areas of a theme park, the communication stations could be more closely spaced together. Correspondingly, the sensitivity of these stations would be reduced so that the number of detecting communication stations is still kept to three or four. By reducing the size of the sectors in densely populated areas, the sensitivity of the system is enhanced in those areas.

A communication station is provided with a transmit and receive (T/R) antenna 1. This antenna is tuned to transmit and receive signals broadcast at the third carrier frequency, to enable the communication station to communicate with the master station 30. A modem 2 demodulates coded signals received from the master station over antenna I. The modem 2 modulates coded signals with the third carrier frequency for transmission by the communication station to the master station 30. An input/output device 3 enables communication between the central processing unit 4 of the station and the transmitting and receiving interface. A data storage device 5 or memory device is used to store the communication station's internal operating system, its display unit software and data relating to the network such as search requests and paged and detected transponder identification codes.

The communication stations must also include means for receiving the response signals from a transponder. A second antenna 6 is provided for receiving these modulated signals. This antenna is tuned to only receive signals from transponders, modulated at the second frequency, TF1. In accordance with the presently preferred embodiment, pages are transmitted from the master station, thus the preferred embodiment of the communication station does not include a transmitter for transmitting pages to the transponders. A demodulator 7 is provided for demodulating the coded signals received over the antenna 6 from the transponders. The demodulator has a signal amplitude operational threshold below which it is unable to identify signals received at the frequency TF1. The sensitivity of the demodulator can be adjusted to change the distance between the transponder and communication station at which the communication station is able to detect a response signal. The input/output device 3 communicates demodulated signals received over the antennae to the central processing unit 4 of the communication station and communicates signals from the central processing unit to modem 2 for transmission by the antenna 1. The central processing unit 4 compares the identification code from a demodulated signal with an identification code which is stored in the data storage device 5 during priming. If they match, a receipt signal is transmitted by antenna 1 to the master station.

An input/output device 8 enables communication between the central processing unit 4 and peripheral devices. The communication station may be provided with a keyboard 9 for interrogation of the communication station. The keyboard 9 may be a means for specifying an identification code to be paged. Alternatively, a magnetic card reader 10 may be used for initiating a paging sequence. A third alternative method for inputting an identification code to be paged is a reception module 11 having means to receive page requests from hand held radio paging request units The reception module 11 may include a separate antenna and demodulation unit together with its own dedicated central processing unit and data storage device for the analysis of search request data received at a fourth carrier frequency. The choice of a peripheral device for inputting page requests is a matter of discretion for any given implementation.

In using a keyboard at a theme park, each parent would be given the identification codes for their children. Each child would be given a transponder so that he or she can be located if lost. A parent would merely go to the nearest communication station and input the identification code of the missing child through the keyboard. An alternative method would be to provide each parent with a magnetic card for each child. If a child is lost, that magnetic card would be input by the parent at the nearest communication station through the card reader 10. This would initiate the paging sequence.

The alternative use of the reception module 11 avoids the need for the parent to find a communication station. A parent carries a hand held radio unit. As with the keyboard 9, the parent can input into the radio unit the number of a child who was lost. The radio unit sends a page request over the fourth carrier frequency to the nearest reception module 11 and a paging sequence is then started when the master station 30 learns of the page request. The hand unit sends the page request several times at differently spaced intervals to avoid signal collisions with other nearby users. An acknowledge signal from a communication station receiving the page will indicate to the user that the page is in progress. The unit is provided with an LCD readout on which the location of the paged transponder can be indicated when found.

Once the locating system has identified the location of a paged transponder, a visual display unit 12 may be used to exhibit the location to the requesting party. Thus, the visual display unit 12 can be provided with a map of the theme park. When a parent is at a communication station requesting a page, the video display unit 12 will display the sector of the park in which the paged transponder has been found. It is presumed that park personnel would assist the parent in locating the child within the identified sector.

Figure 5:
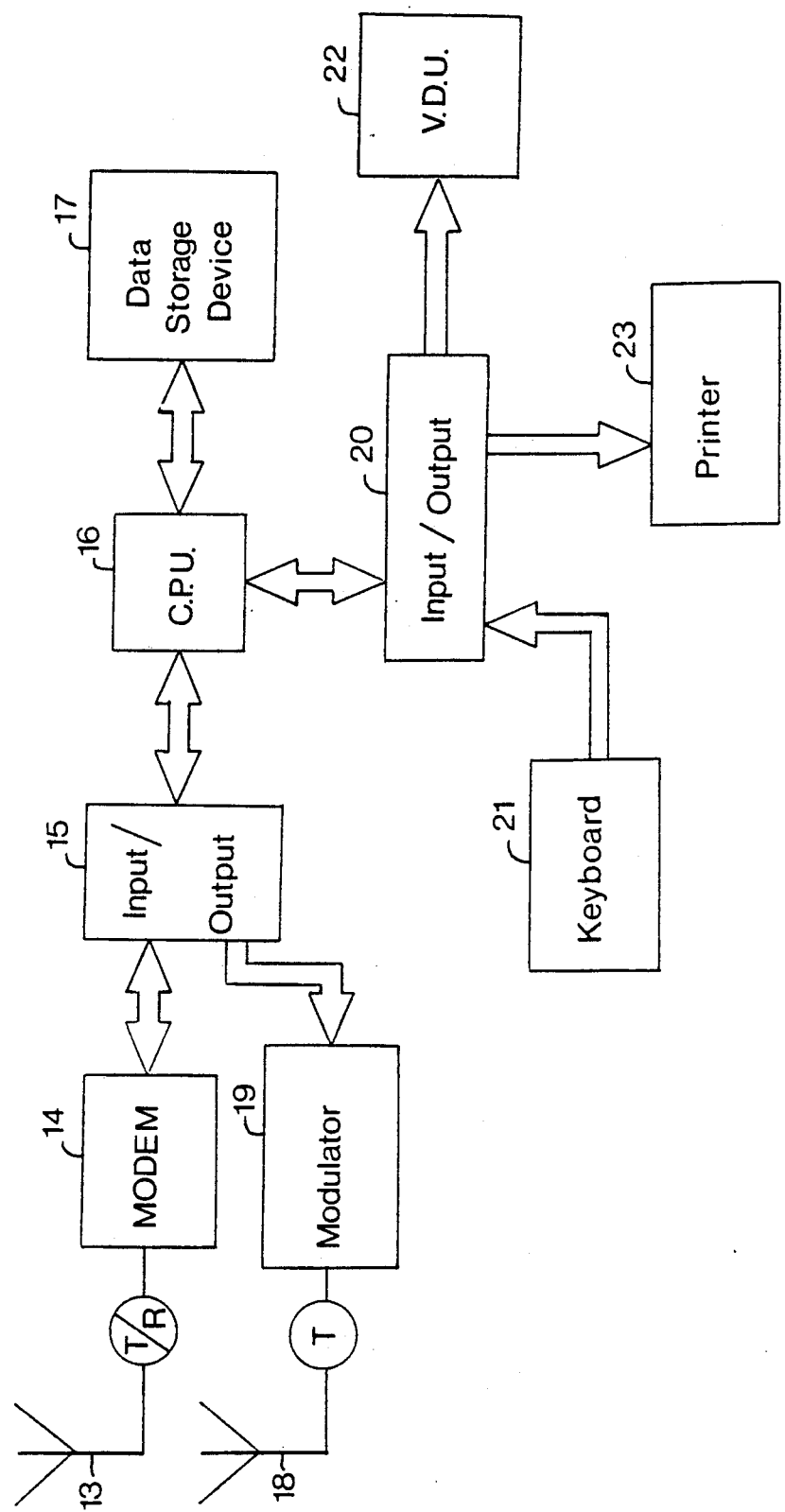
FIG. 5 is a block diagram of a master station for use with the present invention.

Referring now to FIG. 5, the basic functions of the master station shall be described. The master station includes a transmit and receive antenna 13 for communicating with the communication stations at the third carrier frequency. A modem 14 demodulates coded signals that are received from antenna 13 and modulates coded signals with the third carrier frequency when they are to be transmitted from the master station. This provides the communication channel between the master and the communication stations. An input/output device 15 enables communication between the central processing unit 16 of the master station and the transmit and receive units. A data storage device 17 stores the master station's internal operating system, its visual display software and data relating to the network such as search requests and paged and detected transponder identification codes. The master station is provided with a second antenna 18 for transmitting pages at the first carrier frequency. The block marked with a T shows that the antenna is only used for transmission. A modulator 19 is used for modulating the coded identification signals with the second carrier frequency for transmission throughout the surveillance area covered by the locating system. The input/output device 15 provides the interface between the central processing unit 16 of the master station and the paging units including the transmitting antenna 18 and the modulator 19.

An input/output device 20 provides for communication between the central processing unit 16 and peripheral auxilliary devices such as a keyboard 21, a video display unit 22 or a printer 23.

Figure 6:
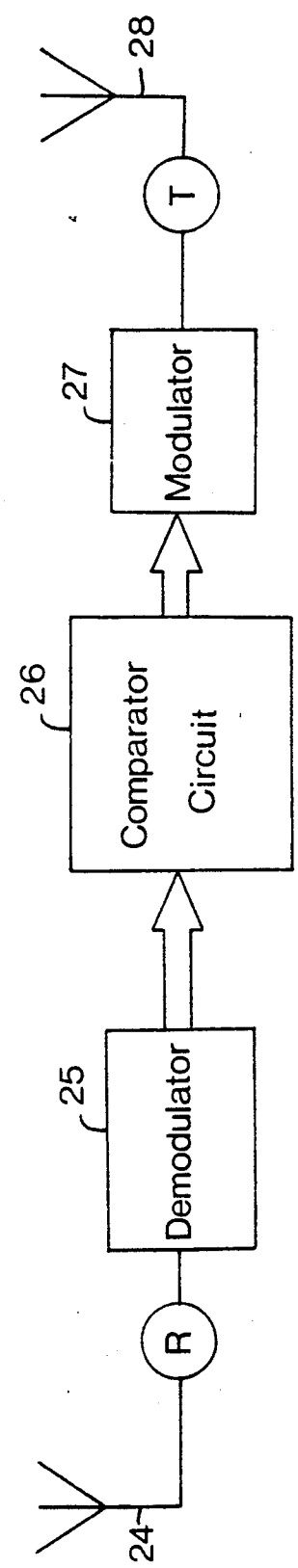
FIG. 6 is a block diagram of a transponder for use with the present invention.

Referring now to FIG. 6, a transponder is a device which receives at one frequency and retransmits the signal at a second frequency. Transponders are available in many shapes and sizes thereby permitting a wide variety of methods for attaching the transponder to a moveable element such as a child at a theme park. A transponder typically includes an antenna 24 suitable for receiving signals modulated at the first carrier frequency. The schematic block marked with an R denotes that this antenna is a receive only antenna. A demodulator 25 demodulates coded signals modulated at the first carrier frequency. The resulting coded signal received by antenna 24 is compared using a comparator circuit 26 with the internally stored identification code for the particular transponder. If the received signal includes the stored identification code for the transponder, the comparator circuit 26 sends a signal including that code to the modulator 27 for transmission. The modulator 27 modulates the coded signal to provide a response signal at the second carrier frequency TF1. The response signal is transmitted by a transmit antenna 28. It may be advisable for the transponder to emit multiple transmissions to increase the possibility of positive reception by the nearest communication stations.

The speed of the locating system and identifying the sector in which a paged transponder is located can be improved by modifying the master station's interrogation sequence. When a page request is provided to a communication station and subsequently from that communication station to the master station, the page is transmitted by the master station. Rather than continuing to cycle through all the communication stations in the surveillance area, to improve the response time and identify the location of the paged transponder, the master station can begin its interrogation of the communication stations in the vicinity of the communication station from which the page request was initially received. This particularly makes sense in a theme park where it is likely a child has not wandered to the other side of the park, but is more likely to be somewhere in the vicinity of the parents.

The locating system of the present invention, can be implemented with one or more master stations. When a plurality of master stations are used, the stations would work together or alone to interrogate the surveillance area.

In accordance with the present invention the signal strengths of the transponders are optimized in conjunction with the receiving capabilities of the communication stations so that the received signals at the communication station are reduced to a simple logical "received" or "did not receive". A predetermined threshold would be implemented at each communication station to achieve the desired goal. In this manner there is no comparison of signal strengths required. The system relies upon the receipt of the transponded signal at the communication stations in the network which border on the sector in which the transponder is located.

When the locating system of the present invention is in operation, the master station is continuously and cyclically interrogating each of the communication stations of the network. This maintains an almost continuous communication link with the entire network of communication stations. This communication link enables: the status of each communication station to be monitored: the identification and initiation of a paging search request; an interrogation of the network to determine which communication station has received the transponded paged identification code; and enables the master station to transmit back to the communication stations the location of the paged transponder. The communication link may also be used to prime all the communication stations with the identification code which will shortly be transmitted in a page.

Communication between the master station and the communication stations is performed over a radio bus. A bus is simply a communications channel used by a number of competing stations. The protocol for the present invention is to permit only a single user on the radio bus at one time. One method of achieving a single user bus is to adopt cyclic addressing. The master station addresses each communication station one at a time. A communication station may access the bus only when directed to do so in response to an interrogation from the master station. Thus, a communication station will not be able to provide its status and a paging request signal until the master station gets around to addressing that communication station. An alternative format can be used for priming, in which the master station broadcasts a message which is received by all communication stations in the network. This can be accomplished by including an address format which all stations will accept or by adding a separate carrier frequency for transmitting a priming signal to all communication stations.

Advantageously, the system of the present invention operates on three radio buses. The master station 30 page the surveillance area on a first bus. The transponders 50 issue responses to the communication stations on a second bus and the master station communicates with the communication stations 40 on a third bus. Communications can take place simultaneously on all three buses since they are on different frequencies. All transmissions on each radio bus should comply with standard radio bus protocol. All transmissions begin with a start-of-transmission code. Similarly the protocol requires all messages to indicate an end of message condition by finishing with an end-of transmission code. In this way, users of each radio bus have a mechanism to determine when transmissions are starting and when they are finishing. Adopting such protocol thus enables users to identify complete messages and to request retransmissions where data collisions are detected. The coded signals each also include a code indicative of the unit which sent it. The communication station transmits signals containing its own identification code thus confirming to the master station which station is making a particular transmission.

While this locating system has been described with reference to a radio based system, it should be understood that the present locating system may be implemented using fiber optics or wired connections between the communication stations and the master station, rather than the radio links described above.

Obviously many other modifications and variations of the present invention are possible in light of the above description. For example, either passive or active transponders can be used. If there are sectors difficult to access due to the interiors of buildings or further reasons, separate communication stations could be set up inside these buildings and an antenna could be mounted externally for communication with the master station. All such variations and modifications are intended to be within the scope of the present invention as defined in the appended claims.

I claim:

1. A system for locating moveable elements within a total area comprising:
   a plurality of transponders, each carried by one of said moveable elements and each being responsive to an associated identification code;
   means for paging said area with one of said identification codes;
   a network of communication stations spaced throughout said area, each including means for receiving response signals sent from within a detection area associated with the communication station and means for communicating with a master station;
   said master station including means for priming said network of communication stations by providing each communication station with said one of said identification codes;
   each of said communication stations including means for comparing said one of said identification codes with said response signals that are received, wherein said master station locates a moveable element to within the intersection of the detection areas of the communication stations which received a response signal that matched said one of said identification codes.

2. The locating system of claim 1 wherein said means for paging transmits said one of said identification codes at a first frequency and the transponder associated with said one of said identification codes includes means for transmitting said response signal at a second frequency different from said first frequency.

3. The locating system of claim 2 wherein said response signal includes the identification code associated with the transmitting transponder.

4. The locating system of claim 2 wherein each of said means for receiving response signals includes an antenna tuned to only said second frequency.

5. The locating system of claim 2 wherein said means for priming said network of communication stations provides said one of said identification codes on a frequency other than said first or second frequencies.

6. The locating system of claim 1 further comprising means at one or more communication station for requesting a page of the total area for one of said identification codes.

7. The locating system of claim 6 wherein said master station includes means for cyclically communicating with each of said communication stations on a third frequency to determine if a page is being requested or if a response signal has been received.

8. The locating system of claim 6 wherein said master station includes means, responsive to a request for a page, for first communicating with communication stations in the vicinity of the communication station which requested the page when attempting to locate the communication stations which received a response signal.

9. The locating system of claim 6 wherein said means for requesting a page comprises a magnetic card reader which reads off an identification code to be searched.

10. The locating system of claim 6, further comprising a hand-held radio transmitter for sending a signal with an identification code to a communication station to request a page for that identification code.

11. The locating system of claim 1 further comprising means for providing a radio bus such that only one page is permitted to be sent out at a time.

12. A system for locating moveable elements within an area comprising:
    at least three arrays of communication stations, said arrays being interspersed over said area so as to define a plurality of sectors within said area each bounded by at least one communication station from each of three of said arrays;
    a plurality of transponders, each carried by one of said moveable elements and each having means to transmit a response signal in response to an associated identification code;
    means for paging said area with one of said identification codes;
    each communication station having means for generating a receipt signal when a transponder transmits a response signal from within a sector bordering said communication station and means for communicating with a master station, wherein said master station locates a moveable element to within a sector bounded by whichever communication stations generate a receipt signal.

13. The locating system of claim 12 wherein said means for generating a receipt signal comprises storing a response signal received from within a bordering sector and using said response signal to form said receipt signal.

14. The locating system of claim 12 wherein said means for paging transmits said one of said identification codes at a first frequency and the transponder associated with said one of said identification codes includes means for transmitting said response signal at a second frequency different from said first frequency.

15. The locating system of claim 14 wherein said master station further includes means for priming said communication stations by providing each of them with said one of said identification codes on a frequency other than said first or second frequencies and wherein each communication station further includes means for comparing a signal received on said second frequency with said one of said identification codes so as to generate the receipt signal only when said one of said identification codes is found in the received signal.

16. The locating system of claim 12 further comprising means at one or more communication station for requesting a page of said area for one of said identification codes.

17. The locating system of claim 16 wherein said master station includes means for cyclically communicating with each of said communication stations to determine if a page is being requested or if a receipt signal has been generated.

18. The locating system of claim 16 wherein said master station includes means, responsive to a request for a page, for first communicating with communication stations in the vicinity of the communication system which requested the page when attempting to locate the communication stations which generated a receipt signal.

19. The locating system of claim 16 wherein said means for requesting a page comprises a magnetic card reader which reads off an identification code to be used in a page.

20. The locating system of claim 16 further comprising a hand-held radio transmitter for sending a signal with an identification code to a communication station to request a page for that identification code.

21. The locating system of claim 12 further comprising means for providing a radio bus so that only one page is permitted to be sent out at a time.

22. A method for locating moveable elements within an area comprising the steps of:
providing each moveable element with a transponder, each transponder having a unique associated identification code;
paging said area with one of said identification codes;
generating a response signal at the transponder which is associated with said one of said identification codes;
transmitting said response signal from the transponder which is associated with said one of said identification codes;
detecting said response signal at one or more fixed communication stations in a network of communication stations spaced apart throughout said area; and
communicating with said network of communication stations to identify the communication stations which detected said response signal so as to locate the moveable element, which was provided within the transponder associated with said one of said identification codes, to within the intersection of areas each defined by a detectable distance readiating from each of the communication stations which detected said response signal.

23. The locating method of claim 22 wherein said step of paging comprises transmitting said one of said identification codes at a first frequency and said step of transmitting said response signal uses a second frequency different from said first frequency.

24. The locating method of claim 23 wherein said step of communicating occurs on a third frequency different from said first and second frequencies.

25. The locating method of claim 22 further comprising the step of requesting from a communication station that a page be sent to search for a moveable element.

26. The locating method of claim 25 wherein said step of communicating with said network of communication stations comprises first communicating with communication stations close to the communication station from which a request for a page was made.

27. The locating method of claim 26 further comprising reporting the location of the moveable element to the communication station from which a request for a page was made upon identifying the communication stations which detected said response signal.

28. The locating method of claim 22 wherein said step of paging includes following a radio bus protocol which permits only one page at a time.

29. A system for locating moveable elements within a total area comprising:
a network of communication stations spaced apart throughout said total area so as to subdivide said total area into a plurality of contiguous sectors each defined by three communication stations, each communication station including means for receiving response signals sent from within one of said sectors defined in part by said communication station and means for communicating with a master station;
a plurality of transponders each carried by one of said moveable elements and each for transmitting one of said response signals in response to receiving an associated identification code; and
means for paging said area with one of said identification codes;
wherein said master station locates a moveable element to within one or two sectors for which all of the communication stations defining said one or two sectors received a response signal from the transponder carried by said moveable element.

30. The locating system of claim 29 wherein said means for paging transmits said one of said identification codes at a first frequency and the transponder associated with said one of said identification codes includes means for transmitting said response signal at a second frequency different from said first frequency.

31. The locating system of claim 30 wherein said means for priming said network of communication stations provides said one of said identification codes on a frequency other than said first or second frequencies.

32. The locating system of claim 30 wherein each of said means for receiving response signals includes an antenna tuned to only said second frequency.

33. The locating system of claim 29 further comprising means at one or more communication stations for requesting a page of the total area for one of said identification codes.

34. The locating system of claim 33 wherein said means for requesting a page comprises a magnetic card reader which reads off an identification code to be searched.

35. The locating system of claim 33 further comprising a hand-held radio transmitter for sending a signal with an identification code to a communication station to request a page for that identification code.

36. The locating system of claim 33 wherein said master station includes means, responsive to a request for a page, for first communicating with communication stations in the vicinity of the communication station which requested the page when attempting to locate the communication stations which received a response signal.

37. The locating system of claim 33 wherein said master station includes means for cyclically communicating with each of said communication stations on a third frequency to determine if a page is being requested or if a response signal has been received.

38. The locating system of claim 29 further comprising means for providing a radio bus such that only one page is permitted to be sent out at a time.

39. The locating system of claim 29 wherein said response signal includes the identification code associated with the transmitting transponder.

40. The locating system of claim 29 wherein said communication stations each have a detection range for receiving response signals which is minimized so as not to extend substantially beyond the sectors defined in part by said communication station.

41. The locating system of claim 39 wherein each sector approximates an equilateral triangle.

* * * * *